M. BLAI.
PORTABLE BUILDING.
APPLICATION FILED FEB. 2, 1920.

1,384,039.

Patented July 12, 1921.
4 SHEETS—SHEET 1.

Fig.1

INVENTOR
M. Blai
BY Munn & Co.
ATTORNEY

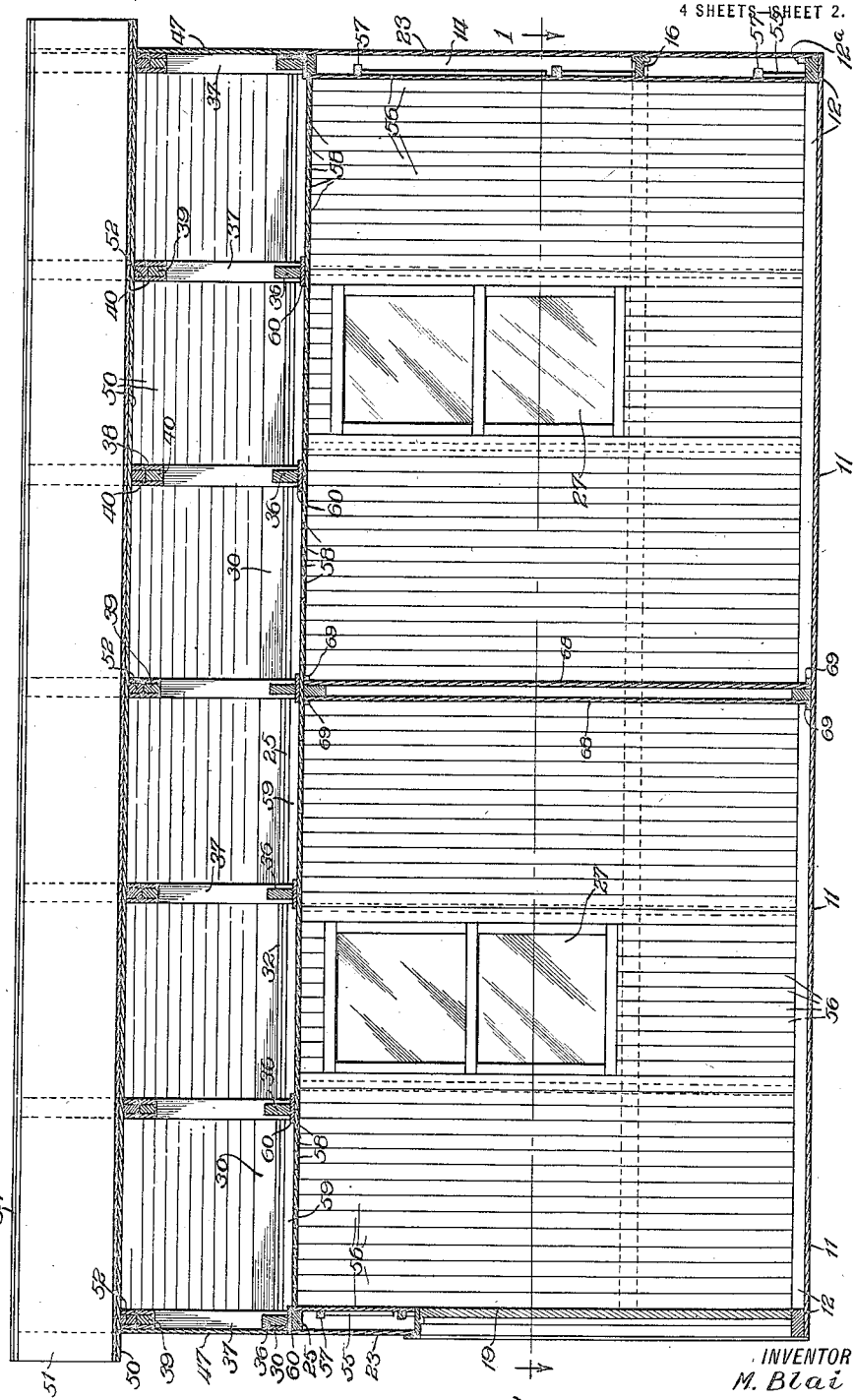

M. BLAI.
PORTABLE BUILDING.
APPLICATION FILED FEB. 2, 1920.
1,384,039.
Patented July 12, 1921.
4 SHEETS—SHEET 3.
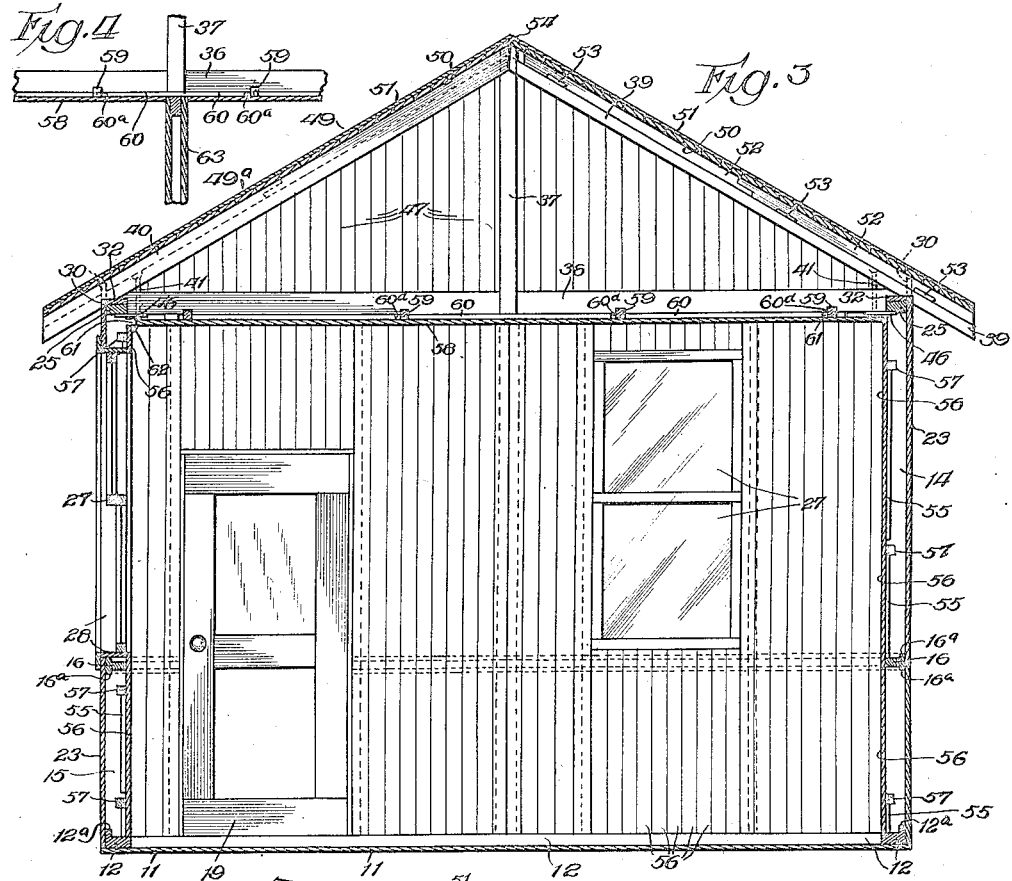
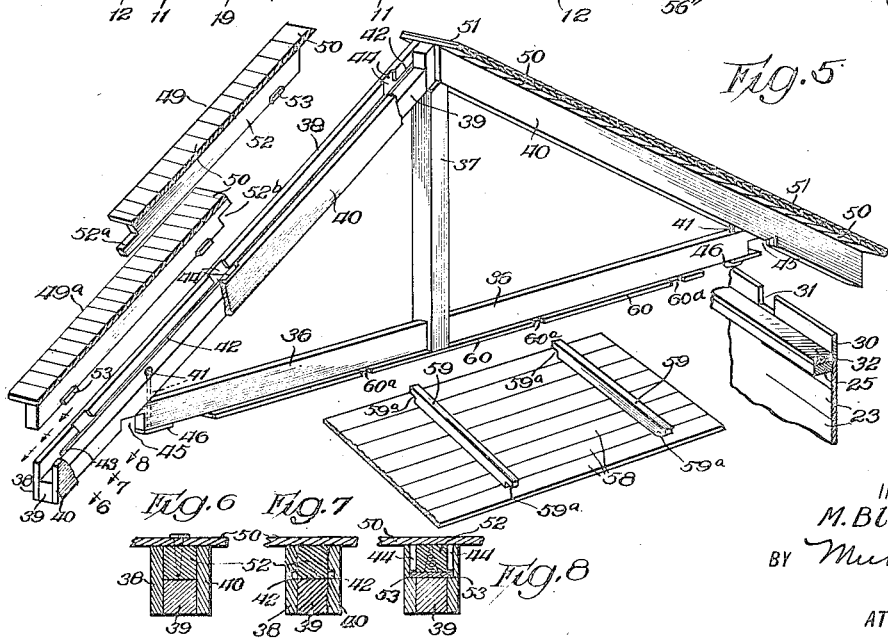
INVENTOR
M. Blai
BY Munn & Co.
ATTORNEYS

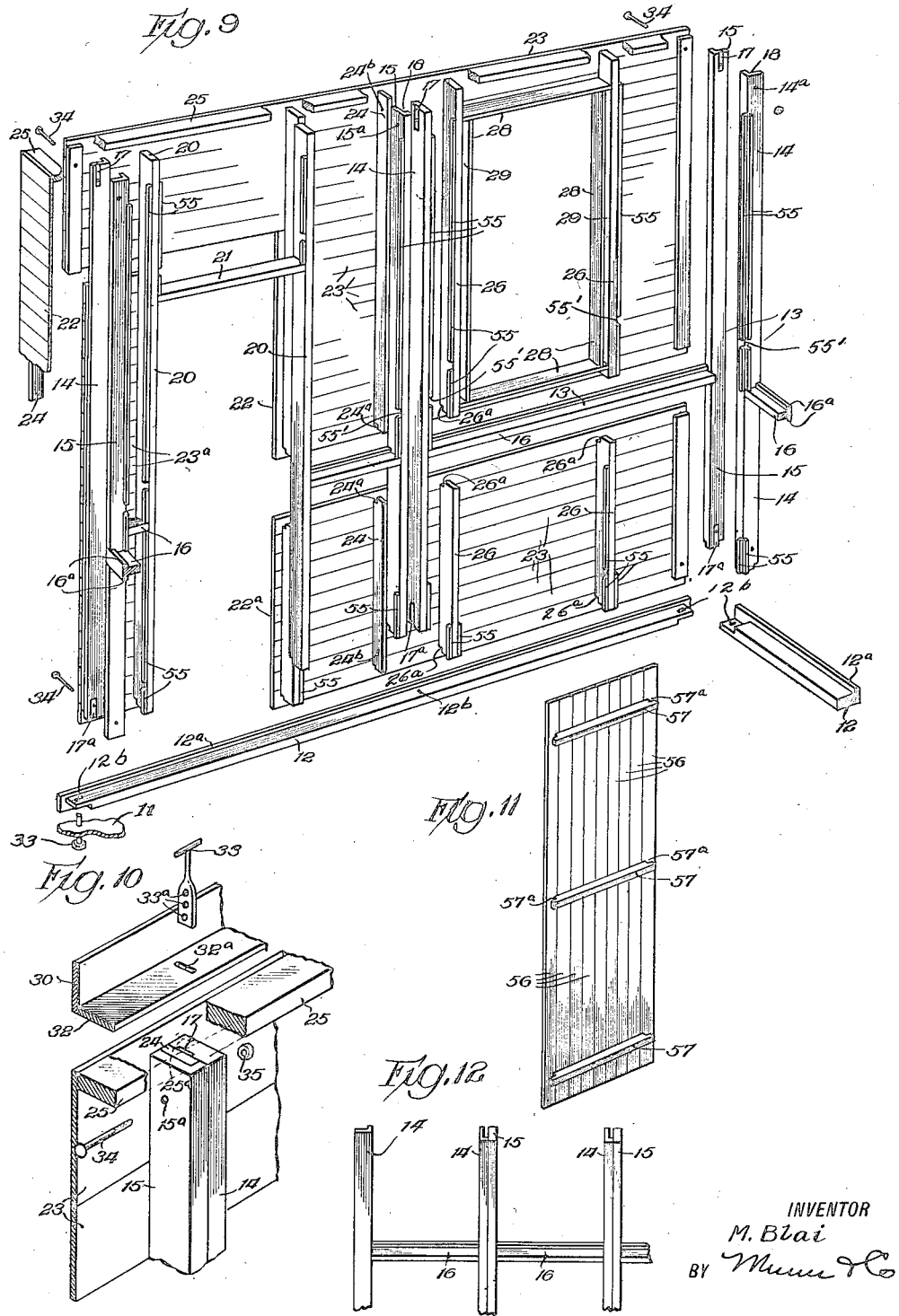

UNITED STATES PATENT OFFICE.

MARTIN BLAI, OF CHICAGO, ILLINOIS.

PORTABLE BUILDING.

1,384,039.   Specification of Letters Patent.   Patented July 12, 1921.

Application filed February 2, 1920. Serial No. 355,889.

*To all whom it may concern:*

Be it known that I, MARTIN BLAI, a citizen of Jugo-Slavia, and a resident of the city of Chicago, in the county of Cook and State of Illinois, have invented a new and useful Improvement in Portable Buildings, of which the following is a full, clear, and exact description.

My invention relates to improvements in portable buildings, and it consists in the combinations, constructions and arrangements herein described and claimed.

An object of my invention is to provide a portable building which, when assembled, does not look like a portable building, but looks like a building of regular construction, by joining the different units together in such a manner that the joints are not noticed.

A further object of my invention is to provide a portable building, the units of which may be assembled easily and quickly.

A further object of my invention is to provide a portable building, the units of which are designed to interlock one with another so that there is necessitated very little bolting of the different units together when assembling the building.

A further object of my invention is to provide a portable building in which the four sides of the building are composed of inner and outer walls thus providing a dead air space between the walls which makes the building cooler in summer and warmer in winter.

Other objects and advantages will appear in the following specification, and the novel features of the invention will be particularly pointed out in the appended claims.

My invention is illustrated in the accompanying drawings, forming part of the application, in which—

Figure 1 is a plan section along the line 1—1 of Fig. 2,

Fig. 2 is a section along the line 2—2 of Fig. 1,

Fig. 3 is a section along the line 3—3 of Fig. 1,

Fig. 4 is a section along the line 4—4 of Fig. 1,

Fig. 5 is a disassembled, perspective view of a portion of the structure,

Fig. 6 is a section along the line 6—6 of Fig. 5,

Fig. 7 is a section along the line 7—7 of Fig. 5,

Fig. 8 is a section along the line 8—8 of Fig. 5,

Fig. 9 is a disassembled, perspective view of a portion of the structure,

Fig. 10 is a perspective view of a portion of the structure, showing the means of locking certain units together, Fig. 11 is a perspective view of a unit used in the building, and Fig. 12 is a modified form of a portion of the structure.

This building is made from different units which are designed to fit together to form houses and garages. The units are shipped to the site of the building and assembled in a short period of time.

The walls of the house that are secured to a floor 11, which is disposed on a foundation (not shown), comprise members 12 with projections $12^a$, the members 12 and the projections $12^a$ extending the length of the respective sides of the floor. Placed side by side on the members 12 are wall frame units 13. Each unit 13 consists of two vertically extending members 14 and 15 and a transverse connecting member 16. Some of the members 14 and 15 are recessed at the top at 17 and the bottom at $17^a$ to receive a bolt for locking purposes described later. Some of the members 14 and 15 are of L-shape in cross-section to form a slot 18 when placed side by side. The member 16 is T-shaped in cross section and forms projections $16^a$. In the unit 13, in which a door 19 is positioned, two additional vertical members 20 and a transverse member 21 are inserted to form a door frame.

Inclosing the frame units 13 are outside wall units 22 and $22^a$. These units consist of horizontally disposed boards 23 which extend the full length of the respective sides of the building and have openings for windows and doors therein (see Fig. 9). The units are adapted to be nailed to vertical members 24 that fit into the slots 18, formed by the members 14, and 15, and are held in place by means of locking bolts described later. The members 24 are notched at $24^a$ to engage the projections $12^a$ of the member 12 and $16^a$ of the member 16. A member 25 is nailed to the boards 23 above the members 24 and extends the length of the boards 23. On the side in which the door is disposed, the boards 23 extend up to the door opening (see Fig. 9), but above the door opening they extend the full length of the building. The boards 23ᵃ are nailed to the members 14 and 20 of the unit 13.

Nailed to the boards 23 of the units 22 and 22ᵃ are vertical members 26 notched at 26ᵃ to engage the projections 16ᵃ and 12ᵃ the members 26 on the unit 22 forming a window frame for windows 27. Boards 28 are nailed to the members 26 which are carried by the unit 22, and form a window casing, thus allowing space 29 for window pulley weights (see Fig. 9).

Members 30 (see Fig. 5), with notched portions 31 which are spaced to correspond to the spacing of the rafters, are nailed to members 32. The members 32, with the members 30 attached, are placed above the members 25 of the wall units 13 and extend the length of the latter.

Where the members 14 and 15 of the units 13 meet, a locking means is provided at the top for locking or holding the units 23 and 13 and the members 32 together, and at the bottom for locking or holding together the units 13, the member 12, and the floor 11. For locking the upper structure in place, a T-shaped bolt 33, with a wide, flat shank in which are drilled three holes 33ᵃ, is inserted in a slot 32ᵃ, in the members 32, a slot 25ᵃ, in the members 25, and the recess 17 in the members 14 and 15 (see Fig. 10). A bolt 34 is inserted in a hole 15ᵃ of the members 15, a hole 24ᵇ in the members 24, the hole 33ᵃ in the bolt 33, and a hole 14ᵃ of the members 14, and a nut 35 is screwed on. This locks the units 13, the units 22, and the members 32 together.

The bolt 33 is inserted in a slot in the floor 11, in a slot 12ᵇ of the members 12, and into the recess 17ᵃ in the members 14 and 15. The bolt 34 is inserted transversely in the holes in the vertical members 14, 24, and 15 and the hole 33ᵃ of the bolt 33, and a nut 35 is screwed on, (see Fig. 10,) thus locking the floor, the units 13, and the units 23 together.

The rafter units consist of a horizontally disposed member 36 (see Fig. 5), a vertical member 37, and two oppositely disposed inclined sets of members 38, 39 and 40. The member 39 is nailed at one end to the member 37, and near the other end a bolt 41 secures it to the member 36. In each of the members 38 and 40, which are nailed to the member 39, is a recess 42 extending substantially the length of the member and forming a stop 43 near the lower end. Three slots 44 communicate with the recess 42.

The rafter units are notched at 45 and are arranged to rest on the members 32 in the notched portions 31, the members 32 and 25 fitting in the slots 45 of the rafter units and the members 36 and 25 being flush on the bottom. Plates 46, which are eccentrically pivoted on the bolts 41, are rotated so that their ends engage the under side of the member 25, thus locking the rafter units in place. Members 47 are nailed to the two end rafters for closing up the ends of the upper part of the building.

There are two roof units to each side of the roof of the building, the upper units 49 and the lower units 49ᵃ. The units consist of horizontally disposed members 50, with a top layer of shingles 51, nailed to transverse members 52. The members 52 of the units 49 are notched to form an extension 52ᵃ to fit into notches 52ᵇ of members 52 of the units 49ᵃ. Attached to the members 52 are plates 53, the ends of which are arranged to slide through the slots 44 and into the recesses 42. The unit 49ᵃ, which is assembled or placed in position first, is held so that the plates 53 and the slots 44 are in alinement with each other, then the unit is moved toward the members 39 until the plates 53 are received in the recesses 42, and then it is moved toward the lower end of the member 39, until the outer plate 53 bears against the shoulders 43. The unit 49 has its extensions 52ᵃ slipped into the slots formed by the members 38, 39, and 40, and is then moved downwardly until the ends of the plates 53 come into alinement with the slots 44. The unit is then moved toward the members 39 until the plate 53 passing through the slots 44, are received by the recesses 42, whereupon the unit is moved downwardly until it bears against the unit 49. The last unit to be placed in position is designed to have an overlapping edge 54 to prevent rain and snow from getting in the building between the roof units (see Fig. 3).

Nailed to the vertical members 14, 15, 20 and 26 are narrow members 55 spaced from each other at 55′. Inside wall units consist of vertically extending members 56 nailed to transverse members 57 which are notched at 57ᵃ to engage the members 55. The members 57 are adapted to be passed through the spaces 55′ and over the tops of the members 55 when the inside wall units are raised a predetermined distance. The units can then be allowed to slide down, the ends of members 57 and 56 engaging the opposite sides of the members 55, thus locking the inside wall units in place. The units extend from the floor to the ceiling, except the units that fit above and below the windows and above the door.

The ceiling units are made similar to the inside wall units, and extend across the width of the house, except the distance where the partition 63 extends. They consist of horizontally disposed members 58 nailed to transverse members 59 which are notched at 59ᵃ. Nailed to the members 36 of the rafter units are members 60 notched at 60ᵃ. The members 59 are spaced on the members 58 the same distance apart as are the notches 60ª in the member 60, and are arranged to slide through the notches 60ª, rest on the member 60, and lock the ceiling units in place. When the units that extend across the width of the building are in place, there is an opening 61 in one corner of the building which is covered by a member 62 nailed to the wall.

On the half of the building in which the partition 63 is situated the ceiling units come in shorter lengths. There is one set of units to each side of the partition. The units are held so that the notches 60ª and the ends of the members 59 are in alinement, then moved up, and then moved always from the center, the ends of the members 59 passing through the notches 60ª and bearing on the members 60. When the two sets of ceiling units are in place, there will be a space wide enough for the top of the partition 63 to fit into (see Fig. 4).

The partition 63 consists of members 64, to which members 65 are nailed. The top is held in place by the two sets of ceiling units and the bottom is nailed to the floor in a suitable manner.

Midway between the ends of the building a partition 66 is located which, with the partition 63, divides the building into three rooms. The partition consists of members 67, to which members 68 are nailed. It is secured in place by nailing members 69 on each side. Doors 70 are provided in the partition 66.

Fig. 12 shows a modified form of the wall frame units. The vertical members 14 and 15 are placed close together, thereby increasing the strength of the building.

From the foregoing description of the various parts of the building, the operation of assembling the same may be readily understood. The floor 11 is placed on a suitable foundation (not shown). At the edges of the floor the members 12 are placed. The lower outside wall units 22ª are held in position on the members 12 until the frame units 13 are positioned. The lower unit 22ª is locked to the members 16 and 12 by means of the members 24 and 26 engaging the projections 16ª and 12ª respectively. The floor 11, the members 12, the frame units 13, and the lower wall units 22ª are locked together by means of the bolts 33 and 34 at the places where the member 14 meets the member 15 of the wall frame units 13.

The upper wall units 22 are positioned on the frame units 13 and locked at the lower end by means of the members 24 and 26 engaging the projection 16ª of the member 16. The members 32, with the members 30 attached, are placed on top of the members 25 of the upper wall units. The members 32, the frame units 13, and the upper wall frame units 22 are locked together by means of the bolts 33 and 34 at the places where the members 14 meet the members 15 of the wall frame units.

The rafters are placed in position and are secured by means of the plate 46. The roof units are then placed in position on the rafters.

After the roof has been placed in position, the inside wall units are locked in place by means of the members 57 of the wall units engaging the members 55 which are attached to the vertical members 26, 20, 14 and 15.

The ceiling units are put in place after the wall has been put up.

The partition 63 is put in position, after which comes the partition 66. The door 19 and the windows 27 can be put in place as soon as the outside wall units 22 and 22ª are up.

I claim:

1. A portable building comprising end walls, side walls, a floor and a roof, said end walls and side walls consisting of vertically extending members and a plurality of superposed units, a plurality of vertically extending strips carried by said members, means for securing said units to said vertically extending members, a plurality of inner wall frames, and means for securing said inner wall frames to said vertically extending strips, whereby said frames form a smooth inner wall.

2. A portable building comprising end walls, side walls, a floor and a roof, said end walls and said side walls consisting of vertical members, and superposed units made up of horizontal strips secured to said vertical members, said horizontal strips extending full length of their respective side or end walls, a plurality of vertically extending strips carried by said members, a plurality of inner wall frames made up of vertical strips, fastened together, means for securing said inner wall frames to said vertical strips, whereby said frames form a smooth inner wall, and a base strip for each wall arranged to rest on the floor.

3. In a portable building, a floor, a roof, side and end walls, said side and end walls consisting of a frame, a plurality of superposed units secured thereto, each unit comprising horizontal strips extending the length of the respective side or end wall, vertical members in said frame having guide strips, and an inner wall comprising a plurality of units, each unit consisting of a plurality of vertically extending strips nailed to cross strips, said cross strips having notches through which said guide strips are adapted to extend for retaining said inner wall units in position.

4. In a portable house, a floor, a roof, side and end walls, said side and end walls consisting of a frame comprising a plurality of vertical members secured to horizontal members, said vertical members having a longitudinally extending groove in their outer sides, a plurality of superposed units, each unit comprising horizontal strips nailed to vertical cleats, said strips extending the length of the respective side or end wall, said cleats adapted to be received in the grooves of said vertical members, and means for securing said cleats to said vertical members.

5. In a portable building, a floor, a roof, sides and ends, said roof comprising horizontal roof members having lateral extending supporting strips provided with notches, ceiling units consisting of horizontally disposed strips, and transverse cleats secured to said strips, each of said cleats having an extension arranged to enter the notches in said rafter member, whereby the ceiling unit may be suspended on said lateral extending supporting members.

MARTIN BLAI.